United States Patent

Zehavi et al.

Patent Number: 5,513,484
Date of Patent: May 7, 1996

[54] HARVESTING, COLLECTION AND TRANSFER APPARATUS

[76] Inventors: Eitan Zehavi, 12 Alonim Street, Kiriat Tivon 36000, Ireland; Matti Laserson, 520 N. Island, Golden Beach, Fla. 33160; Steven Frank, 63 Cottage St. #1, Newton, Mass. 02164

[21] Appl. No.: 278,623

[22] Filed: Jul. 21, 1994

[51] Int. Cl.⁶ .................................................. A01D 46/20
[52] U.S. Cl. ............................... 56/16.6; 56/329; 56/480
[58] Field of Search ....................... 56/329, 476, 480, 56/473.5, 16.6, 228, 205, 206, 340.1; 460/119

[56] References Cited

U.S. PATENT DOCUMENTS

| | | |
|---|---|---|
| 2,689,054 | 9/1954 | Martin . |
| 2,696,317 | 12/1954 | Toffolon . |
| 2,829,896 | 4/1958 | Swenson . |
| 2,977,148 | 3/1961 | Ford . |
| 3,013,684 | 12/1961 | King et al. . |
| 3,282,621 | 11/1966 | Peterson . |
| 3,548,579 | 12/1970 | Shipley, Jr. ............................... 56/329 |
| 3,877,593 | 4/1975 | Sleziak . |
| 3,896,612 | 7/1975 | McHugh et al. ........................... 56/329 |
| 3,918,600 | 11/1975 | Lyon . |
| 4,569,187 | 2/1986 | Spiker et al. ......................... 56/16.6 X |
| 4,792,171 | 12/1988 | Lamy ...................................... 294/68.3 |
| 5,148,661 | 9/1992 | Kennedy .............................. 56/16.6 X |
| 5,187,928 | 2/1993 | McKenna et al. ...................... 56/328.1 |
| 5,190,436 | 3/1993 | Sorlie ..................................... 414/667 |
| 5,228,279 | 7/1993 | McKenna, Jr. et al. ............... 56/328.1 |

Primary Examiner—Terry Lee Melius
Attorney, Agent, or Firm—Cesari and McKenna

[57] ABSTRACT

A transfer station for collecting and transferring harvested material to large transport vehicles includes a hopper, in which harvested material accumulates, supported on a rigid frame. The hopper may be elevated from a lower "collection" height to an upper "transfer" height that facilitates release of harvested material into the transport vehicle. In one embodiment, the contents of the hopper are poured into a collection vehicle by tilting the entire transfer-station frame. In a second embodiment of the invention, the transfer-station frame does not tilt. Instead, the hopper is equipped with a sloped floor member. When lifted vertically and positioned over a collection vehicle, the hopper discharges by gravity as soon as an opening is established at the base of the slope.

18 Claims, 6 Drawing Sheets

FIG. I

HARVESTING, COLLECTION AND TRANSFER APPARATUS

BACKGROUND OF THE INVENTION

1. Field of the Invention

The present invention relates to fruit- and nut-harvesting equipment, and more particularly to apparatus for collecting harvested material, generally from trees, and transferring the harvest from its collection sites to large vehicular trailers.

2. Description of the Related Art

Mechanical devices for harvesting fruit and nuts from trees typically operate by gripping the tree trunk and imparting thereto a controlled, low-frequency vibration or shaking action. This operation dislodges the fruit or nuts, which are then collected and transported.

A typical tree-shaking apparatus includes two opposing clamp members that engage the tree trunk, and which are themselves driven by dual oscillation or vibration units. Because droppage occurs over the relatively wide area corresponding to the extent of the tree's foliage, suitable collection apparatus must span this area yet be conveniently transportable from tree to tree. Such apparatus generally also includes a local conveying assembly for drawing the harvest to a collection point after it falls from the tree.

Subsequent transfer of the harvest from local collection points to a central repository, where it is prepared for bulk shipment, can impose considerable logistical problems. Indeed, such difficulties arise in many harvesting contexts, whether or not removal from trees is involved. One approach, exemplified by copending application Ser. No. 08/164,891, utilizes a self-propelled forklift-type device to haul relatively small bags of harvest from collection sites to a central site. Such arrangements, while flexible and particularly well-suited for small orchards, can become unworkable in larger agricultural operations having substantial numbers of collection sites and a distant central repository.

For these applications, larger intermediate collection vehicles are desirable Unfortunately, such vehicles (such as flatbed trailers) can be difficult to load, particularly from harvesting apparatus designed to dislodge fruit or nuts from trees. These apparatus typically collect harvest over a wide area, and are therefore quite large. See, e.g., U.S. Pat. Nos. 4,269,021, 3,623,308, 5,191,758, 5,123,238, and 1,626,068, and copending application Ser. No. 08/165,028. The limited maneuverability both of such devices and of the large collection vehicle itself—particularly in orchard environments, where vehicles are constrained to move within narrow lanes—can obviate the possibility of their simultaneous utilization.

DESCRIPTION OF THE INVENTION

1. Objects of the Invention

Accordingly, it is an object of the present invention to provide a collection and transfer system for conveniently transferring harvested material to a large collection vehicle.

It is another object of the invention to provide a novel collection and transfer system suitable for use with fruit- and nut-harvesting apparatus.

It is a further object of the invention to provide a collection and transfer system that enables large harvesting equipment, such as tree-shaking apparatus, to be utilized in conjunction with large collection vehicles.

Other objects will, in part, be obvious and will, in part, appear hereinafter.

The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

2. Brief Summary of the Invention

In accordance with the invention, a transfer station includes a hopper, in which harvested material accumulates, and which may be elevated from a lower "collection" height to an upper "transfer" height. The hopper is supported on a rigid frame, which it overhangs in part, thereby allowing collection vehicles such as flatbed trailers to be conveniently positioned under the hopper to receive the accumulated harvest. The transfer station also includes means for conveying harvest into the hopper at its collection height. Although the invention is not limited to use in conjunction with tree-shaking apparatus, it is particularly well-suited for such applications. The conveying means can be a belt coupled directly to the catch-frame of a tree shaker (thereby dispensing with the need for associated collection trays and the like), while that same apparatus can be employed to facilitate discharge of the hopper contents into a collection vehicle.

For example, in a first embodiment of the invention, the contents of the hopper are poured into a collection vehicle (positioned under the overhanging discharge end) by tilting the entire transfer-station frame. This tilting can be accomplished by means (such as a hydraulic piston) associated directly with the frame, but is more preferably achieved by rotating part of the catch-frame of a harvesting apparatus to which the transfer station is coupled. This rotation lifts an end of the transfer-station frame out of a horizontal orientation, driving the harvest out of the hopper through an exit port.

In a second embodiment of the invention, the transfer-station frame does not tilt. Instead, the hopper is equipped with a sloped floor member. When lifted vertically and positioned over a collection vehicle, the hopper discharges by gravity (due to the weight of the harvest) as soon as an opening is established at the base of the slope.

BRIEF DESCRIPTION OF THE DRAWINGS

The foregoing discussion will be understood more readily from the following detailed description of the invention, when taken in conjunction with the accompanying drawings, in which.

Figure 3A:
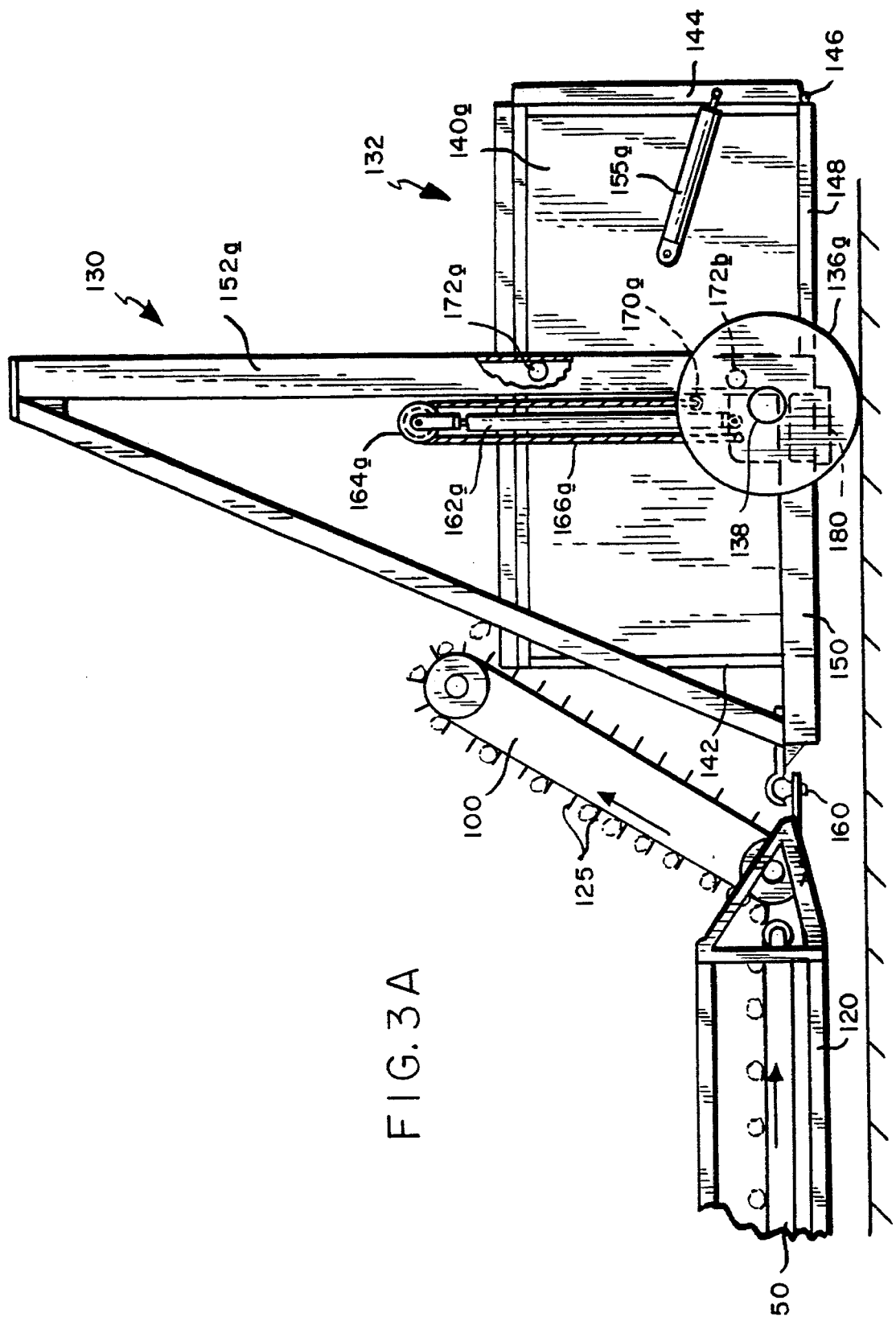
FIG. 3A is a side elevation of the invention itself, shown hitched to the side of a harvest-conveying assembly (associated, for example, with the catch-frame shown in FIG. 1), with the hopper at a lower "collection" height.
Figure 3B:
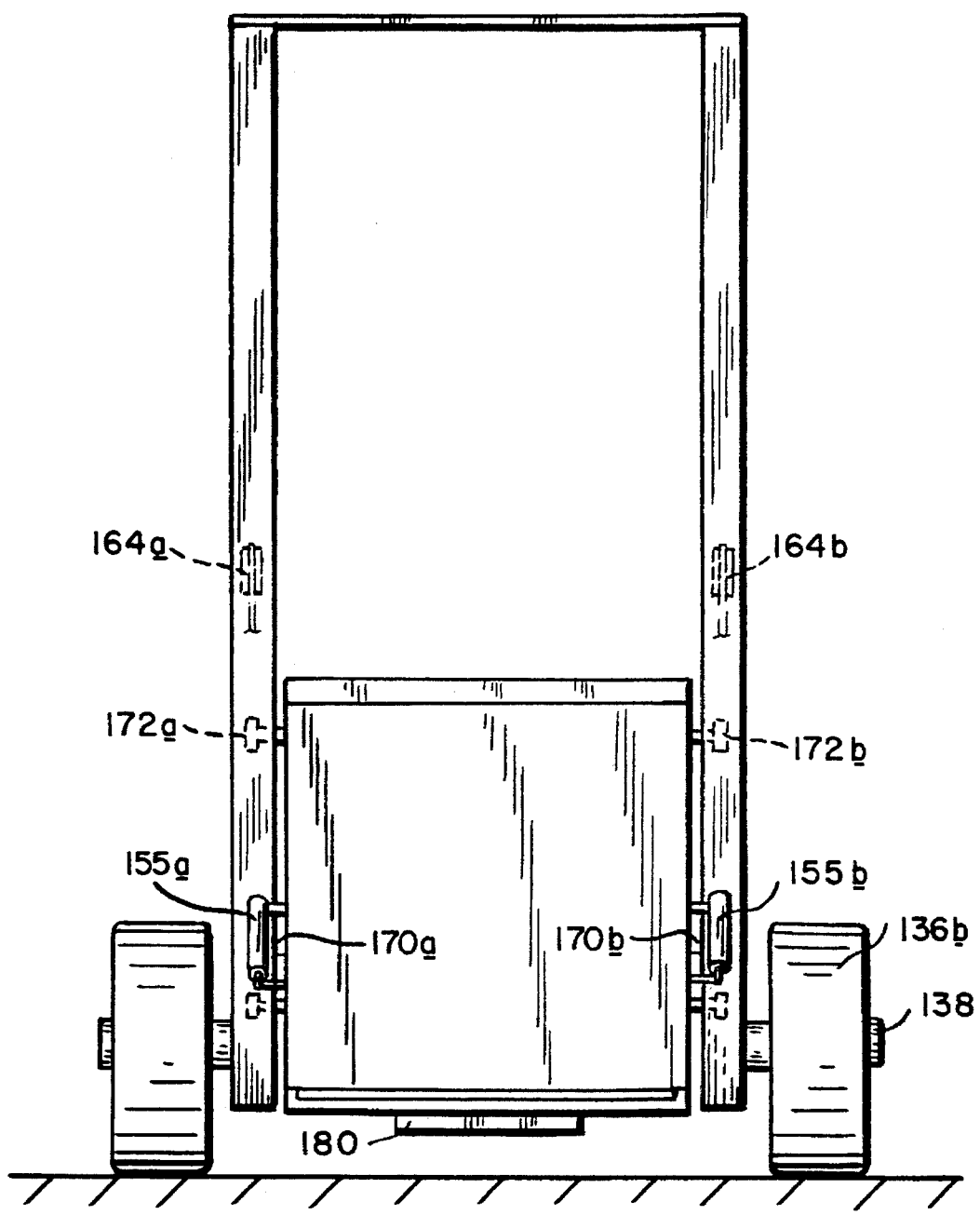
Figure 4:
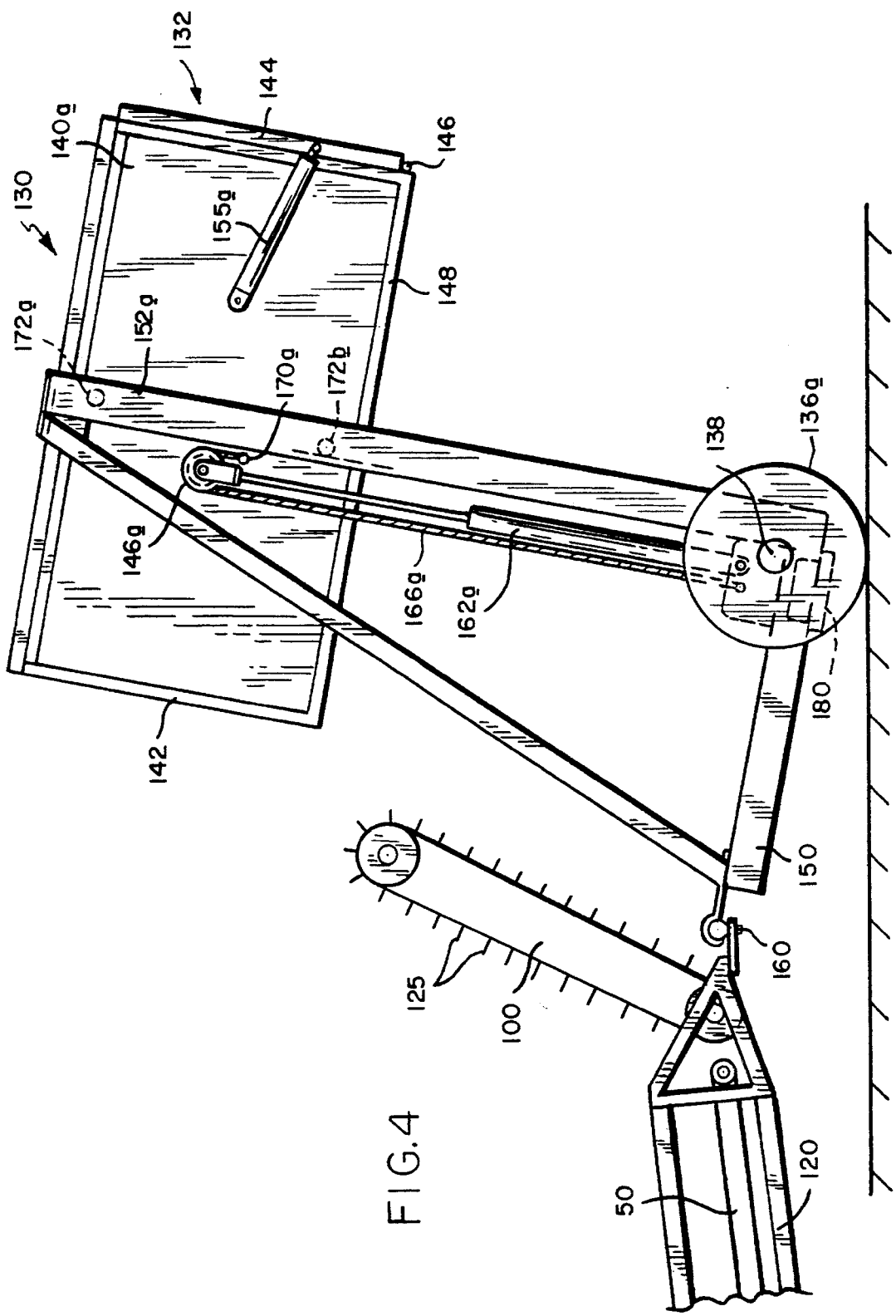

PIG. 3B is a rear elevation of the embodiment illustrated in FIG. 3A;

FIG. 4 is a side elevation of the invention as configured in FIGS. 3A and 3B, but with the frame tilted and the hopper raised to an upper "transfer" height.

Figure 5:
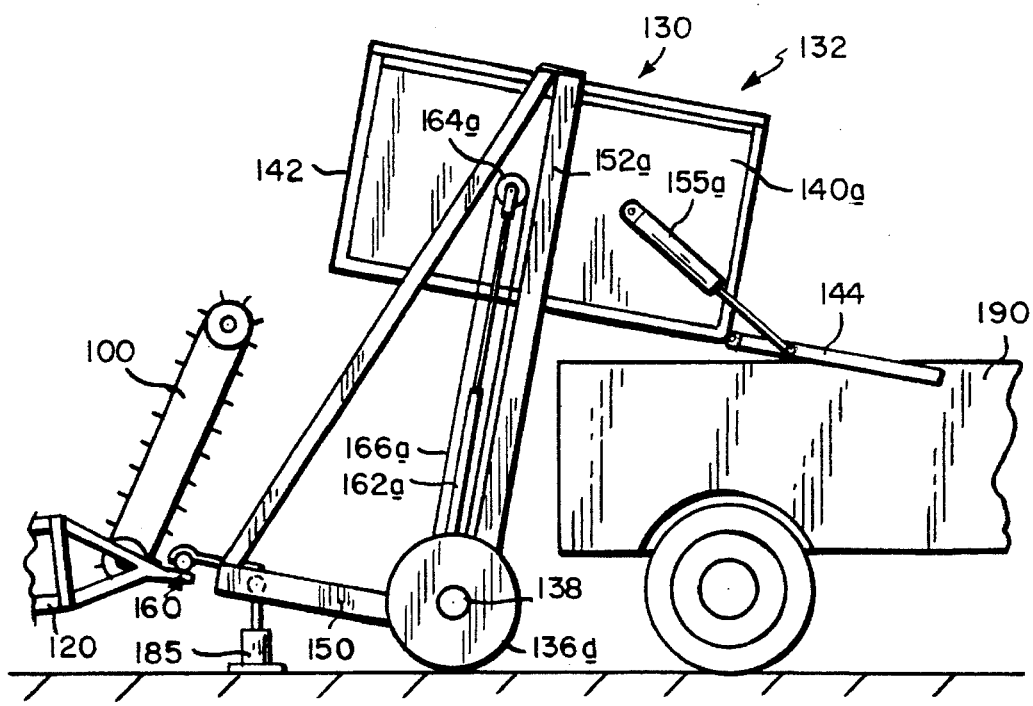
Figure 6:
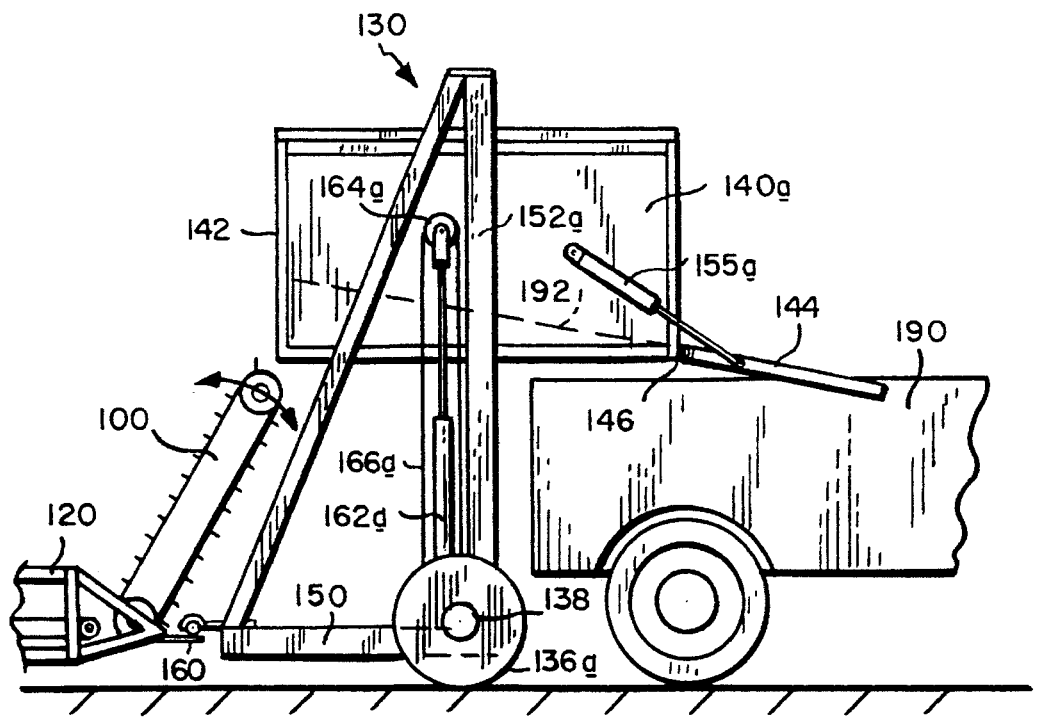

FIG. 5 is another side elevation showing the manner in which a fully loaded and tilted hopper, raised to the transfer height, is discharged into a collection vehicle; and FIG. 6 is a side elevation illustrating the second embodiment of the invention, wherein the hopper is lifted without tilt and the contents enter a collection vehicle by means of a sloped floor.

DETAILED DESCRIPTION OF THE PREFERRED EMBODIMENTS

Figure 1:
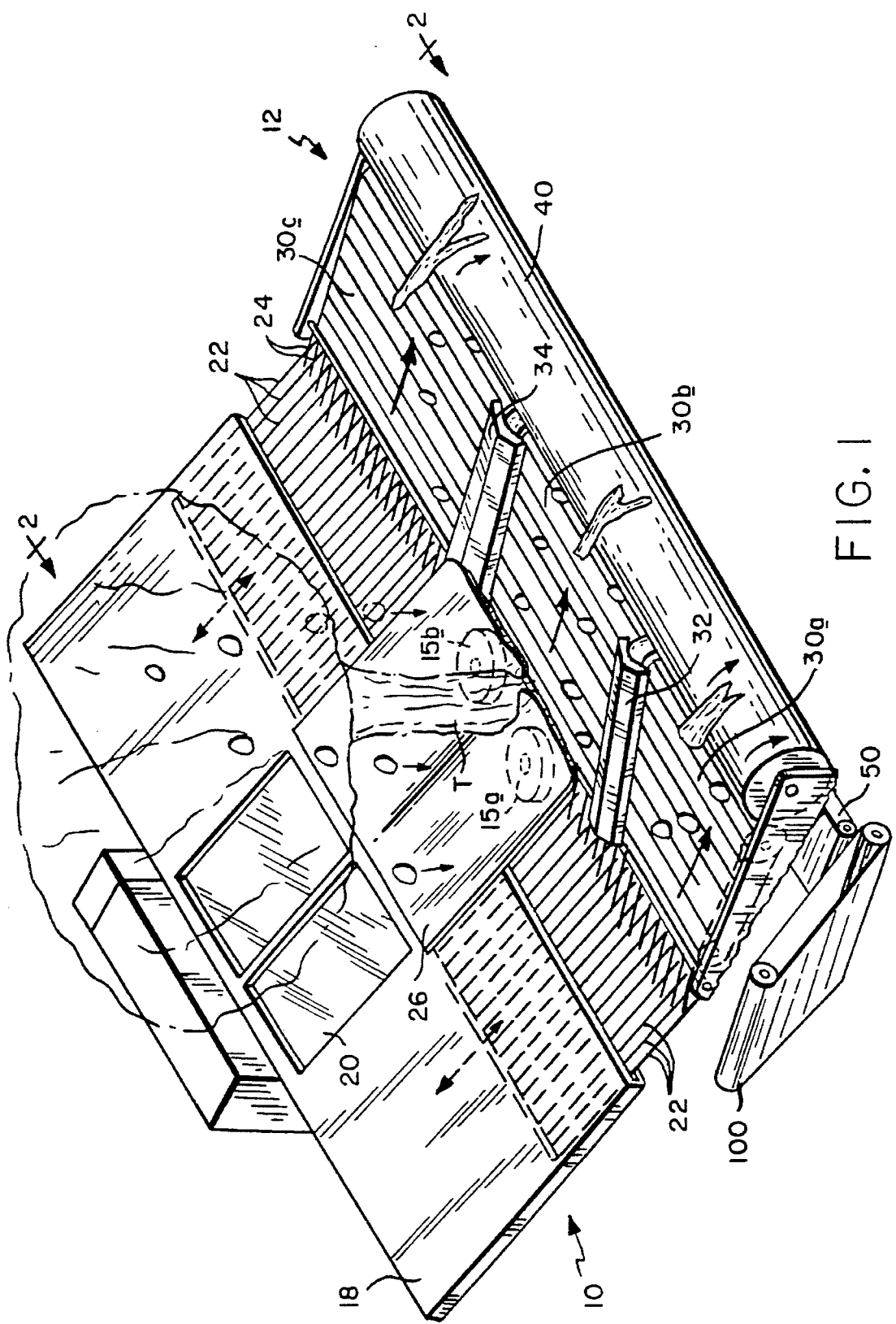
FIG. 1 is an isometric view of both the collection and shaking components of a representative tree-shaking apparatus that may be used in conjunction with the present invention.

Refer first to FIG. 1, which shows a tree-shaking and harvesting apparatus suitable for use in conjunction with the present invention. The illustrated apparatus includes a shaking and deflection unit 10 and a catch-frame 12. Shaking unit 10 imparts vibration to a tree T by means of two oscillation units 15a and 15b, which engage opposite sides of the tree. Oscillation units 15a and 15b can be of standard design (see, e.g., U.S. Pat. Nos. 3,338,040, 3,548,578 and 4,903,471) or in accordance with the teachings of copending application Ser. No. 08/165,026, commonly owned with the present invention.

Shaking unit 10 also includes a tilted planar face 18, which is resilient enough to withstand the bombardment of harvest as it falls from the tree being shaken, and which guides the harvest toward the collection unit 12. A window 20 is preferably provided in face 18 to allow the driver to conveniently position the unit 10 so that oscillation units 15a and 15b, when extended as described below, will flank tree T.

Shaking unit 10 also includes a series of rods or "fingers" 22 arranged in two clusters on opposite sides of oscillation units 15a and 15b. Rods 22 are spaced sufficiently close to one another to prevent harvested fruit or nuts from slipping between them and falling to the ground. Collection unit 12 contains a complementary series of rods 24, also arranged in opposing clusters with a gap therebetween, and which interlace with rods 22 during operation. The portion of shaking unit 10 occupied by oscillation units 15a and 15b is covered by an apron 26.

Collection unit 12 gathers dislodged fruit or nuts by means of a series of conveyors 30a, 30b and 30c. These are separated by two peaked dividers 32 and 34. A longitudinal rotating brush 40 removes large debris such as leaves and branches transported by the conveyors, while the harvest falls into a gap 42 (see FIG. 2) between the conveyors and brush 40 and thereupon onto a take-off conveyor 50. Conveyor 50 discharges harvest onto a transfer conveyor 100 associated with the transfer station of the present invention.

Figure 2:
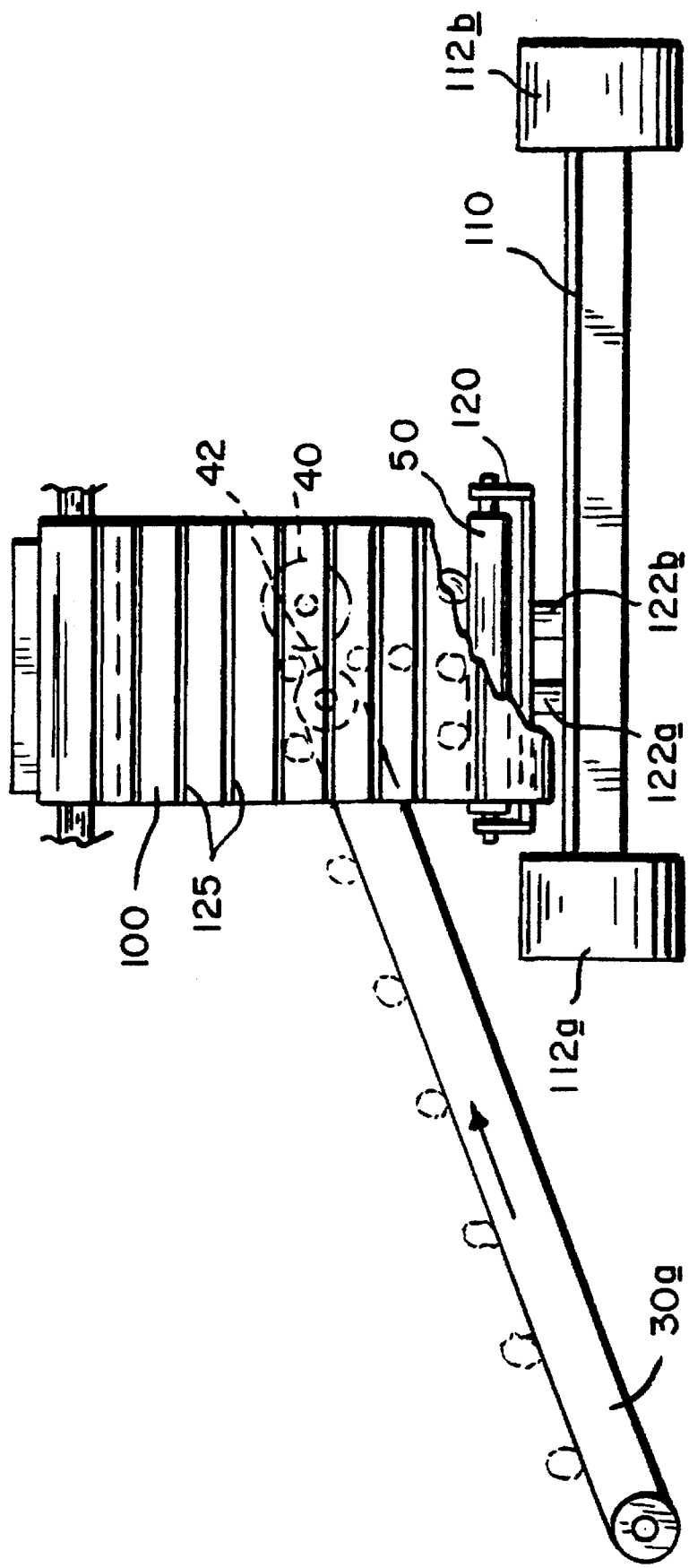
FIG. 2 is a side elevation showing the basic components of the catch-frame portion of the apparatus illustrated in FIG. 1, viewed along the line 2—2 shown in FIG. 1.

FIG. 2 illustrates additional features of catch-frame 12 relevant to the present invention. The components of catch-frame 12 are supported on a vehicular chassis 110, which is equipped with standard engine and drive components that facilitate locomotion. Preferably, a pair of caterpillar treads 112a, 112b are driven in forward or reverse directions by a diesel engine (not shown); an operator steers the entire apparatus by establishing differential tread speeds. Conveyor 50 is supported within a cradle 120, which does not rest directly on top of chassis 110, but is instead supported with respect thereto by a pair of hydraulic cylinders 122a, 122b. The cylinders are spaced along the length of cradle 120 to facilitate lengthwise rocking thereof, as described in greater detail below, and are supplied with hydraulic pressure from a conventional source (not shown).

The manner in which harvested material carried by conveyor 50 is delivered to transfer conveyor 100 is shown most clearly in FIGS. 3A and 3B. Transfer conveyor 100 is provided with a series of ridges or cupped walls 125, which retain harvested material as it is carried upward.

With continued reference to FIGS. 3A and 3B, the transfer station of the present invention includes a transportable frame 130 and a hopper 132 engaged thereto. Frame 130 rolls on a pair of opposed wheels 136a, 136b, and which rotate about an axle 138 affixed to and spanning the width of frame 130. Hopper 132 includes a pair of opposed side panels 140a, 140b; a pair of opposed end panels 142, 144, the latter having a hinge 146 that facilitates a downward excursion; and a floor panel 146. Movement of panel 144 is controlled by a pair of remotely actuated hydraulic cylinders 155a, 155b.

Frame 130 is hitched at its leading end to cradle 120 of the catch-frame such that harvest ejected from transfer conveyor 100 falls within hopper 132. The hitching assembly 160 accommodates both vertical and horizontal rotations. A substantial portion of hopper 132 resides inside the volume defined by frame 130, resting on a bottom support member 150, although at least some portion of hopper 132 extends beyond the trailing end of the frame. The trailing end is defined by the rear of support member 150 and a pair of vertical braces 152a, 152b, which are preferably steel C-beams. Depending on size and desired load capacity, frame 130 may be provided with additional struts, braces and gussets as appropriate.

The invention includes a lifting assembly to raise hopper 132 from its lower collection height shown in FIGS. 3A and 3B to its upper transfer height shown in FIG. 4. The lifting assembly includes a pair of hydraulic lifting pistons 162a, 162b. However, instead of directly lifting hopper 132, which can become quite heavy when filled, pistons 162a, 162b each include a terminal pulley 164a, 164b that operates against an associated lifting cable 166a, 166b. One end of cable 166a, 166b is anchored to frame 130, while the other end is attached, by means of a swivel mount 170a, 170b, to hopper 132.

In operation, hopper 132 is fed with harvested material by transfer conveyor 100 until the hopper is substantially full. Pistons 162a, 162b are simultaneously supplied with pressure from a hydraulic power source 180 (which also supplies pressure to hydraulic cylinders 155a, 155b), lifting hopper 132. Smooth vertical movement of hopper 132 is ensured by a set of rollers 172a, 172b, 172c, 172d. These are rotatably affixed to hopper 132 and ride along interior walls in the hollow of vertical braces 152a, 152b.

Once the filled hopper is lifted, an intermediate collection vehicle 190 (see FIG. 5), such as a large truck or flatbed trailer, is positioned thereunder to receive the harvest. The contents of hopper 132 are discharged in either of two ways. In a first embodiment, illustrated in FIGS. 4 and 5, hydraulic pistons 122a, 122b associated with the catch-frame (see FIG. 2) are operated so as to rotate cradle 120, thereby lifting frame 130 out of the horizontal orientation shown in FIG. 3 and into a tilted orientation, as shown in FIG. 4. This action draws belt 100 backward so that hopper 132, when lifted, will clear it. In this configuration, with the operation of the transfer station so directly tied to movement of catch-frame 12, it may prove more convenient to dispense with power source 180 and connect hydraulic cylinders 155a, 155b, 166a and 166b to the power source associated with catch-frame 12, thereby centralizing control of all collection and transfer elements with the catch-frame operator.

Alternatively, as shown in FIG. 5, the transfer station of the present invention may be provided with its own hydraulic tilting piston 185 which, when actuated, lifts the leading end of frame 130 off the ground. In any case, after hopper 132 is lifted and the collection vehicle 190 brought into position, pistons 155a, 155b are extended, opening panel 144 about hinge 146 until it is coplanar with floor panel 148 as shown in FIG. 5. Accumulated harvest exits hopper 132 and spills into collection vehicle 190.

In a second embodiment of the invention, illustrated in FIG. 6, the tilting action is dispensed with entirely, and hopper 132 provided with a sloped floor 192 inclined toward panel 144. Hopper 132 may then be lifted vertically, without subsequent tilting, and panel 144 opened to an angle below horizontal (and preferably coplanar with sloped floor 192). The degree of incline depends on the nature of the harvest and the dimensions of hopper 132; this parameter is easily determined by those skilled in the art without undue experimentation.

Any of several approaches may be employed to allow hopper 132 to clear conveyor 100. For example, if the harvested material is large in size, hopper 132 may be positioned just ahead of the path of ridges 125, so that harvest will tumble over the edge of hopper 132 and into its interior when ejected from conveyor 100; or ridges 125 can be made flexible so as to yield as hopper 132 brushes past them when it is raised, thereby allowing conveyor 100 to overhang hopper 132 slightly; or conveyor 100 can be hinged with respect to cradle 120 and retracted as shown in FIG. 6 before hopper 132 is raised.

It should be stressed that the invention can be deployed in a variety of environments that do not make use of tree shakers or belt-type conveyors. For example, the invention may be hitched to a tractor that gathers or collects harvest, which is continuously or periodically delivered to hopper 132 by means of a conduit or the like.

It will therefore be seen that the foregoing represents an efficient approach to accommodating transfer of harvested material into large intermediate collection vehicles. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for transferring collected fruit or nuts harvested from a tree, the apparatus comprising:
   a. a hopper for receiving harvested material;
   b. a rigid frame supporting the hopper;
   c. an elevating assembly for lifting the hopper from a first height to a second height within the frame; and
   d. means for tilting the frame so as to discharge harvested material from the hopper without pivoting the hopper.

2. The apparatus of claim 1 further comprising a vehicle that includes a platform to which the frame is hinged, wherein the tilting means comprises means for rotating the platform about an axis so as to lift an end of the frame out of a horizontal orientation.

3. The apparatus of claim 1 wherein the frame has leading and trailing edges, the hopper extending beyond the trailing edge of the frame, and wherein the tilting means is a hydraulic piston that lifts the leading edge of the frame off the ground.

4. The apparatus of claim 1 wherein the frame is supported by a pair of rotatably mounted wheels.

5. The apparatus of claim 1 wherein the hopper has leading and trailing ends, the trailing end extending beyond the frame and having a door panel hinged thereto.

6. The apparatus of claim 4 wherein the hopper further comprises a floor panel to which the door is hinged, the door panel opening to an extended position substantially coplanar with the floor panel.

7. The apparatus of claim 1 wherein the conveying means is a trayless belt assembly that both collects harvested material dislodged from a tree and conveys the material to the hopper.

8. An apparatus for collecting and transferring fruit or nuts harvested from a tree, the apparatus comprising:
   a. a hopper having a plurality of side panels, one of which is hinged, and a floor panel sloped toward the hinged side panel;
   b. a rigid frame supporting the hopper;
   c. an elevating assembly for lifting the hopper from a first height to a second height within the frame;
   d. means for conveying harvested material to the hopper; and
   e. means for opening the hinged side panel to release the harvested material from the hopper.

9. The apparatus of claim 8 wherein the frame is supported by a pair of rotatably mounted wheels.

10. The apparatus of claim 8 wherein the hopper has leading and trailing ends, the trailing end extending beyond the frame and terminating in the hinged side panel.

11. The apparatus of claim 10 wherein the hinged side panel is hinged to the floor panel, the hinged side panel opening to an extended position substantially coplanar with the sloped floor panel.

12. The apparatus of claim 8 wherein the conveying means is a trayless belt assembly that both collects harvested material dislodged from a tree and conveys the material to the hopper.

13. An apparatus for collecting and transferring fruit or nuts harvested from a tree, the apparatus comprising:
   a. means for agitating a tree to dislodge fruit or nuts therefrom;
   b. trayless conveying means for collecting material dislodged from a tree;
   c. a vehicle for moving the conveying means along the ground;
   d. a hopper for receiving material from the conveying means;
   e. a rigid frame, hingedly coupled to the vehicle, for supporting the hopper;
   f. an elevating assembly for lifting the hopper from a first height to a second height within the frame; and
   g. means for tilting the frame so as to discharge harvested material from the hopper without pivoting the hopper.

14. The apparatus of claim 13 wherein the tilting means comprises means for rotating a portion of the vehicle about an axis so as to lift an end of the frame out of a horizontal orientation.

15. The apparatus of claim 13 wherein the frame has leading and trailing edges, the hopper extending beyond the trailing edge of the frame, and wherein the tilting means is a hydraulic piston that lifts the leading edge of the frame off the ground.

16. The apparatus of claim 13 wherein the frame is supported by a pair of rotatably mounted wheels.

17. The apparatus of claim 13 wherein the hopper has leading and trailing ends, the trailing end extending beyond the frame and having a door panel hinged thereto.

18. The apparatus of claim 17 wherein the hopper further comprises a floor panel to which the door is hinged, the door panel opening to an extended position substantially coplanar with the floor panel.

* * * * *